(12) United States Patent
Sauter

(10) Patent No.: US 8,335,734 B1
(45) Date of Patent: Dec. 18, 2012

(54) METHOD OF ADMINISTERING AN INVESTMENT COMPANY HAVING A CLASS OF CROSSING SHARES

(75) Inventor: George Upham Sauter, Malvern, PA (US)

(73) Assignee: The Vanguard Group, Inc., Valley Forge, PA (US)

( * ) Notice: Subject to any disclaimer, the term of this patent is extended or adjusted under 35 U.S.C. 154(b) by 659 days.

(21) Appl. No.: 12/505,897

(22) Filed: Jul. 20, 2009

(51) Int. Cl.
*G06Q 40/00* (2012.01)

(52) U.S. Cl. ............................ 705/36 R; 705/35; 705/37

(58) Field of Classification Search .................... 705/35, 705/36 R, 37
See application file for complete search history.

(56) References Cited

U.S. PATENT DOCUMENTS

| | | | |
|---|---|---|---|
| 5,689,652 A | 11/1997 | Lupien et al. | |
| 5,845,266 A | 12/1998 | Lupien et al. | |
| 5,950,177 A | 9/1999 | Lupien et al. | |
| 6,029,146 A | 2/2000 | Hawkins et al. | |
| 6,098,051 A | 8/2000 | Lupien et al. | |
| 6,236,972 B1 | 5/2001 | Shkedy | |
| 6,247,000 B1 | 6/2001 | Hawkins et al. | |
| 6,601,044 B1 | 7/2003 | Wallman | |
| 6,879,964 B2 | 4/2005 | Sauter et al. | |
| 2007/0061235 A1 * | 3/2007 | Timmons et al. | 705/36 R |

FOREIGN PATENT DOCUMENTS

| | | |
|---|---|---|
| WO | WO 00/26834 A2 | 5/2000 |
| WO | WO 01/07986 A2 | 2/2001 |
| WO | WO 01/18711 A2 | 3/2001 |
| WO | WO 01/61547 A2 | 8/2001 |
| WO | WO 01/61549 A2 | 8/2001 |

OTHER PUBLICATIONS

Wilfred L. Dellva; *Exchange-Traded Funds Not for Everyone*; Journal of Financial Planning; Apr. 2001; vol. 14, No. 4; pp. 110-124; ISSN: 10403981.
Jason Zweig; *I Can Get It for You Wholesale*; Forbes; Jan. 4, 1993; p. 278.
Vineeta Anand; *DOL Move Could Save Managers Millions*; Pensions and Investments; Jun. 15, 1998; p. 32.
*DOL Issues Class Exemption for Cross-Trading by Index and Model-Driven Funds*; BA Trust Letter; Mar. 2002; pp. 1, 9+.
*Corporate Pension Group Favors Relaxing Rules on Trading, Investment Advice*; PR Newswire; Mar. 9, 2000.
Vineeta Anand; *DOL Proposal: Cross-Trading Exemption Could Save Millions for Pension Funds; Quants, Indexers to Get OK for Swapping among Portfolios*; Pensions and Investments; Dec. 27, 1999; p. 2.
Andy Serwer et al.; *Up against the Wall: Dick Strong Runs His Mutual Fund Firm with a Raging Passion. And Passion Can Get You into a Lot of Trouble*; Fortune; Nov. 24, 2003; p. 130.
Clare Dobie; *Stock Exchange Gets a New Rival*; The Independent (London); May 4, 1993; p. 22.

(Continued)

*Primary Examiner* — Lalita M Hamilton
(74) *Attorney, Agent, or Firm* — RatnerPrestia

(57) ABSTRACT

A mutual fund having at least one class of crossing shares that cannot be redeemed for cash unless there is a crossing request to buy shares in the fund and at least one class of non-crossing shares. The fund may offer one or more of several other non-cash redemption options that minimize transaction costs incurred by the fund. The non-crossing shares may include one or more conventional share classes and/or one or more exchange-traded share classes. Additional redemption options available to holders of crossing shares may include redemption in kind for a basket of representative financial assets, conversion to exchange-traded shares (where available), or redemption for cash less a redemption fee.

24 Claims, 2 Drawing Sheets

OTHER PUBLICATIONS

*Online Hedge Fund 'Exchange' to Open*; Futures; Dec. 1999; vol. 28, No. 12; p. 22; ISSN: 07462468.

William Doyle; *Your Money*; The Atlanta Journal and Constitution; Apr. 1, 1993; p. 2.

Chuck Paustian; *Supply vs. Demand: Existing Closed-End Fund Shares at a Premium*; Pensions & Investment Age; Feb. 22, 1988; p. 23.

Jade Hemeon; *Wellington West Is on the March Again: Independent Dealer to Open 17th Office*; National Post's Financial Post & FP Investing (Canada); Sep. 21, 2004; p. FP10.

*Securitizing Real Estate—An Update: Interview with Frank Russell Co.'s Chief Real Estate Advisor Blake Eagle*; Journal of Property Management; Mar. 1993; vol. 58, No. 2; p. 44; ISSN: 0022-3905.

*Barclay's Global Investors' Equity Index Fund Product Data*; Equity Product Data from Nelson MarketPlace; Thomson Nelson Information; New York, NY; 2005; pp. 1-4.

*Barclay's Global Investors' U.S. Equity Market Fund Product Data*; Equity Product Data from Nelson MarketPlace; Thomson Nelson Information; New York, NY; 2005; pp. 1-2.

\* cited by examiner

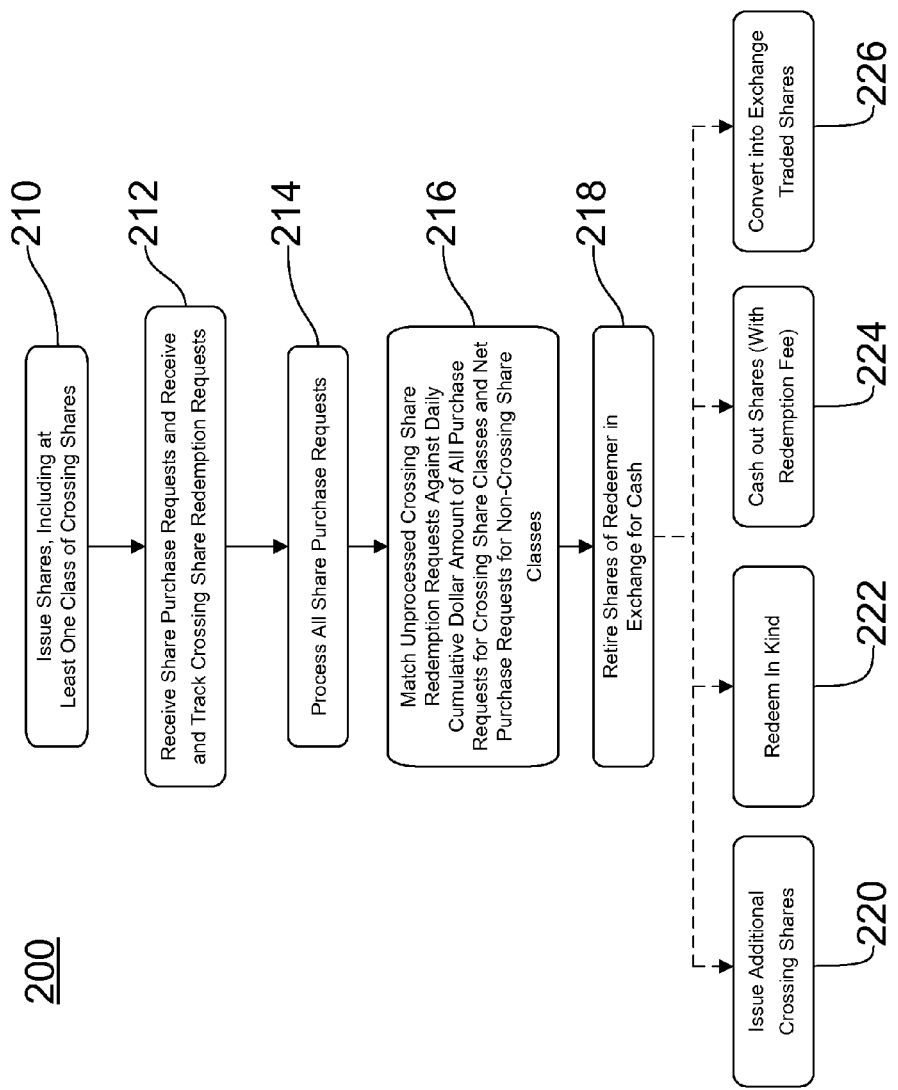

US 8,335,734 B1

METHOD OF ADMINISTERING AN INVESTMENT COMPANY HAVING A CLASS OF CROSSING SHARES

FIELD OF THE INVENTION

The present invention relates, in general, to a method of administering an investment company. More specifically, the present invention relates to a method of minimizing or eliminating the detrimental impact of transaction costs incurred by an investment company while enabling the investment company to have greater flexibility in accepting potentially shorter term investments.

BACKGROUND OF THE INVENTION

An investment company (hereinafter "investment fund") is a company (corporation, business trust, partnership, or limited liability company) that is primarily engaged in the business of investing in securities. The investment fund issues shares that are bought by investors and then invests the money received from the investors on a collective basis. The investment fund's performance is based upon the performance of its investments in securities and in other assets. Each investor proportionally shares in the investment fund's profits and losses. The value of an investment fund's shares is measured by adding up the value of the securities and any other assets it owns, subtracting liabilities, and dividing by the number of outstanding shares. This figure is known as the investment fund's "net asset value" (NAV). It is typically calculated once per day, at the close of the financial markets.

There are three types of investment funds: open-end funds, closed-end funds, and unit investment trusts (UITs). Open-end funds generally sell shares on a continuing basis, and investors purchase shares from the open-end fund itself. Closed-end funds do not continuously offer their shares for sale, but instead sell a fixed number of shares at an initial public offering, after which the shares typically trade on a secondary market, such as the New York Stock Exchange or the Nasdaq Stock Market. A UIT typically will make a one-time public offering of only a specific, fixed number of units (like closed-end funds). Many UIT sponsors maintain secondary markets for trading UIT units.

The shares issued by open-end funds and the units issued by UITs are redeemable, i.e., they can be tendered back to the fund or a broker acting for the fund in exchange for cash (or in rare cases securities) at the NAV. Closed-end fund shares are generally not redeemable but, as mentioned above, often may be sold on a secondary market at a price determined by the market.

Share redemptions in which shares are tendered back to an investment fund in exchange for cash may result in transaction costs incurred by the investment fund. When investment fund managers have to sell securities, the investment fund incurs transaction costs and, potentially, realizes capital gains. Over time, transaction costs and realized capital gains negatively affect the performance of the investment fund and significantly reduce the return on investment and the after-tax return of taxable investors. Thus, investment fund managers strive to minimize transaction costs and realization of capital gains to maintain the investment fund as an attractive investment for investors. One method for achieving efficiency is effected by placing restrictions on trading shares to prevent market timing or otherwise restricting cash flow. Such restrictions might prohibit a person or institution who has a short time horizon from purchasing shares in the investment fund. In this way, an investment fund may discourage market timing.

SUMMARY OF THE INVENTION

One aspect of the present invention comprises a method of administering an investment fund that is an aggregation of a plurality of underlying financial assets. The method comprises issuing at least one class of shares that are purchased and redeemed from the investment fund at a net asset value, including at least one class of crossing shares having crossing share redemption restrictions, and issuing at least one class of non-crossing shares. Crossing share redemption requests are tracked in a computer system, and only as many crossing share redemption requests from one or more redeeming parties are processed for cash redemption as there are an offsetting cumulative dollar amount of share purchase requests. Such crossing share redemption requests are processed by purchasing crossing shares redeemed by the one or more redeeming parties and retiring the redeemed crossing shares in exchange for cash equal to the number of redeemed crossing shares multiplied by a net asset value of the redeemed crossing shares. The redeemed crossing shares correspond to the processed crossing share redemption requests.

The aforementioned class of non-crossing shares may comprise a class of conventional shares having redemption or purchase restrictions different from the aforementioned crossing share redemption restrictions, in which case the method further comprises permitting redemption of the conventional shares for cash without requiring an equivalent number of share purchase requests. Where the class of non-crossing shares comprises a class of conventional shares, in some embodiments, the step of processing crossing share redemption requests may include using net purchase requests for conventional shares to offset crossing share redemption requests, whereas in other embodiments the processing step may be limited to using crossing share purchase requests only.

The aforementioned class of non-crossing shares may also or instead comprise a class of exchange-traded shares, in which case the method further comprises permitting a holder of crossing shares to redeem the crossing shares and acquire exchange-traded shares by converting a designated number or dollar value of crossing shares for a monetarily equivalent number of exchange-traded shares.

Another aspect of the present invention comprises a method for minimizing transaction costs in an investment fund comprising an aggregation of a plurality of underlying financial assets. The method comprises issuing at least one class of exchange-traded shares that are listed for trading on a securities exchange and that are bought and sold at negotiated market prices, and issuing two or more classes of non-exchange-traded shares. The two or more classes of non-exchange-traded shares include at least one class of crossing shares that are purchased and redeemed from the investment fund at a net asset value and that have one or more crossing share redemption restrictions and at least one class of conventional shares that are purchased and redeemed from the investment fund at a net asset value and that have one or more conventional share restrictions different from the crossing share redemption restrictions. The method processes, in a computer system, redemptions of crossing shares requested by holders of the crossing shares without the conventional share restrictions and without a redemption fee only (i) for cash if there is an offsetting value of cash requests to purchase shares in the investment fund, (ii) for exchange-traded shares by conversion of the crossing shares for a monetarily equivalent value of exchange-traded shares or (iii) for a basket of the underlying financial assets represented by the crossing shares of the holder. Redemption for cash without a redemption fee comprises transferring net cash tendered by purchasers of shares to holders of the crossing shares without purchase or sale of any underlying financial assets.

Yet another aspect of the present invention comprises a method for administering an investment fund comprising an aggregation of a plurality of underlying financial assets. The method comprises issuing a plurality of shares that are each purchased and redeemed from the fund at a net asset value, including one or more crossing shares having crossing share redemption restrictions. Crossing share redemption requests are tracked in a computer system, and only as many crossing share redemption requests from one or more redeeming parties are processed for cash redemption as there are an offsetting cumulative dollar amount of share purchase requests. Such crossing share redemption requests are processed by purchasing crossing shares redeemed by the one or more redeeming parties and retiring the redeemed crossing shares in exchange for cash equal to the number of redeemed crossing shares multiplied by a net asset value of the redeemed crossing shares. The redeemed crossing shares correspond to the processed crossing share redemption requests.

BRIEF DESCRIPTION OF THE DRAWINGS

The invention is best understood from the following detailed description when read in connection with the accompanying drawings. Included in the drawings are the following figures:

FIG. 2 is a flow diagram of a method of administering the investment fund of FIG. 1, in accordance with an embodiment of the present invention.

DETAILED DESCRIPTION OF THE INVENTION

Figure 1:
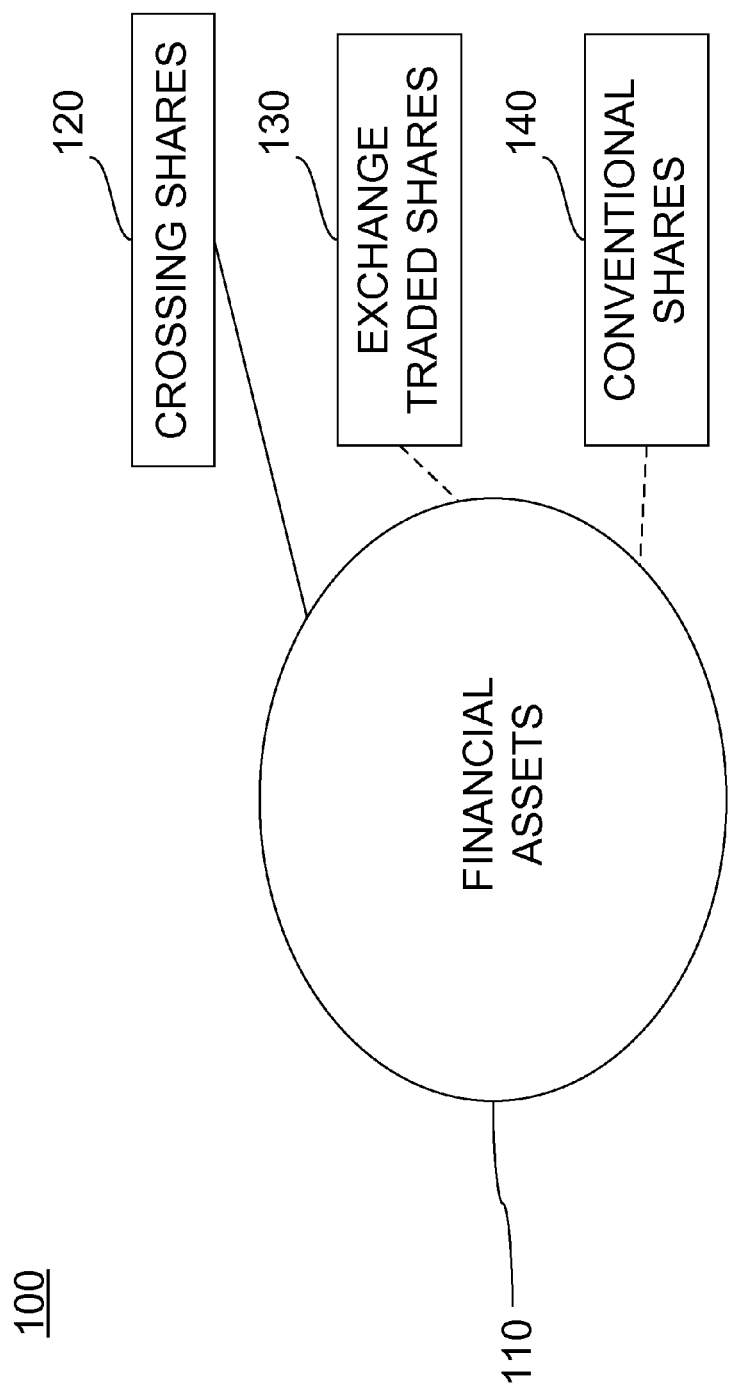
FIG. 1 is an illustration of an investment fund comprising a number of classes of shares, including a class of crossing shares, in accordance with an embodiment of the present invention.

Many investors, including large institutional investors, have a need to trade frequently and would benefit from a class of shares in an investment fund that provides for and facilitates short-term trading. Such a class of shares would allow large institutional investors the flexibility to purchase shares in investment funds for short-term trading. It is therefore desirable to provide a method for administering an investment fund that minimizes or eliminates transaction costs and realization of capital gains, but allows short-term traders to purchase and redeem shares in the investment fund.

An embodiment of the present invention is described below in the context of an investment fund comprising a pool of financial assets. The investment fund is not limited in the type of financial assets it may hold. Thus, it is contemplated that the investment fund may hold any type of liquid financial asset, such as equities, futures, derivatives, options, bonds, currencies, and the like. Accordingly, where the context permits, the term "financial assets" includes any financial instrument that can be traded or redeemed, such as equities, futures, derivatives, options, bonds, and currencies.

Referring now to FIG. 1, there is depicted an investment fund 100 in accordance with an exemplary embodiment of the present invention. Investment fund 100 comprises a pool 110, which is an aggregation of underlying financial assets, and at least one class of crossing shares 120. Typically, investment fund 100 is managed by a fund manager or administrator who may actively manage investment fund 100 and the underlying pool 110 of financial assets to achieve the stated goals of investment fund 100 or who may manage investment fund 100 to track an index of financial assets. In an exemplary embodiment, investment fund 100 is a mutual fund. In another exemplary embodiment, investment fund 100 is a collective trust or a unit investment trust (UIT).

An exemplary embodiment of investment fund 100 comprises at least one class of exchange-traded shares 130 and at least one class of conventional shares 140, in addition to crossing shares 120. Share classes other than crossing shares are shown in FIG. 1 with dashed connecting lines to depict that they are optional.

Details associated with an investment fund that issues a class of conventional shares and a class of exchange-traded shares in the same fund are provided in U.S. Pat. No. 6,879,964, issued on Apr. 12, 2005, naming a common co-inventor and assignee of the present invention, and incorporated herein by reference. Crossing shares 120 and the conventional shares 140 (as well as any other shares not in the class of exchange-traded-shares 130) may be characterized as "non-exchange-traded shares." Exchange-traded shares 130 and conventional shares 140 (as well as any other shares not having crossing restrictions) may be characterized as "non-crossing shares." Accordingly, conventional shares 140 may be characterized as non-exchange-traded, non-crossing shares.

It should be noted that although the exemplary embodiment illustrated in FIG. 1 shows a number of different classes of shares, specifically, a class of crossing shares 120, a class of exchange-traded shares 130, and a class of conventional shares 140, embodiments having fewer classes of shares in any combination (including multiple crossing share classes, multiple exchange-traded share classes, or multiple conventional share classes) may also be provided, including, but not limited to, embodiments comprising only one or more classes of crossing shares, embodiments comprising only one or more classes of crossing shares and one or more classes of conventional shares, and embodiments comprising only one or more classes of crossing shares and one or more classes of exchange-traded shares.

Initially, crossing shares 120, exchange-traded shares 130, and/or conventional shares 140 are issued by investment fund 100 at an initial offering to investors at a net asset value (NAV). Each share represents an undivided interest in a basket of financial assets in pool 110. The money received from the initial offering is used to purchase financial assets for pool 110. Conventional shares, if included, may have restrictions on purchases of shares, or repurchase of shares after redemption, as discussed herein later. Crossing shares 120 have special restrictions on redemption, as discussed below. Except via authorized participants, exchange-traded shares 130 may be liquidated by an investor only by selling them on an exchange, as known in the art and discussed in U.S. Pat. No. 6,879,964.

FIG. 2 illustrates a method 200 of administering investment fund 100 in accordance with an exemplary embodiment of the present invention. The discussion of FIG. 2 focuses on steps 212, 214, and 216 as they pertain to crossing shares, but it should be understood that where additional classes of shares exist, these steps pertain to those classes of shares as well.

In step 210 of method 200, investment fund 100 issues various classes of shares, including at least one class of crossing shares 120. Investors typically purchase the various classes of shares, including the crossing shares 120, from investment fund 100 in the initial offering at the NAV, less any fees. After the initial offering, in embodiments in which investment fund 100 is an open-ended fund, investors may continue to buy new shares from investment fund 100 at the then-current NAV.

As indicated in step 212, investment fund 100 receives purchase requests for all share classes (herein referred to as "share purchase requests"), e.g., classes 120, 130, and 140, and receives and tracks redemption requests for crossing shares 120 (herein referred to as "crossing share redemption requests"). A share purchase request is a request made by an investor to purchase a share from investment fund 100. A crossing share redemption request is a request made by an investor to redeem a crossing share that the investor owns.

Typically, the tracking of crossing share redemption requests comprises noting when crossing share redemption requests were made and placing the requests into a queue as they are received, with the top of the queue corresponding to the oldest or first unprocessed crossing share redemption request and later crossing share redemption requests appended to the bottom of the queue. Priority is assigned to the crossing share redemption requests in the order that they are received: The oldest or first crossing share redemption request in the queue is given the highest priority and each next crossing share redemption request is given a next lower priority. Priority, as is described below, will determine in what order the crossing share redemption requests are processed.

Share purchase requests are processed in step 214. In this step, cash is tendered by purchasers of shares pursuant to the share purchase requests. As used herein, the term "cash" refers to any form of money, including currency, checks, money orders, wire transfers, or accounts accessible by the fund administrator for recording credits or debits. The cash associated with each share purchase request is used to purchase shares of investment fund 100. Thus, the share purchaser receives a share and relinquishes the cash value equal to the number of shares multiplied by the NAV in step 214. The crossing share redemption requests are tracked as they are made.

In step 216, investment fund 100 begins processing the crossing share redemption requests against a daily cumulative dollar amount of purchase requests for crossing share classes and net purchase requests for non-crossing share classes. Processing these requests in step 216 comprises processing only as many crossing share redemption requests as there are an offsetting cumulative dollar amount of purchase requests for crossing share classes and net purchase requests for non-crossing share classes. Once the daily cumulative dollar amount of purchase requests for crossing share classes and net purchase requests for non-crossing share classes is exhausted, i.e., no further crossing share redemption requests may be offset by an equivalent dollar amount of purchase requests for crossing share classes and net purchase requests for non-crossing share classes not already offsetting a crossing share redemption request, any remaining crossing share redemption request is left unprocessed. Crossing share redemption requests are processed in step 216 at the close of the trading period for that day, when the NAV is calculated. In one exemplary embodiment, crossing share redemption requests are only offset by an equivalent dollar amount of crossing share purchase requests. In another exemplary embodiment, crossing share redemption requests are offset first by an equivalent amount of crossing share purchase requests and then by an equivalent amount of non-crossing share net purchase requests.

Stated another way, processing of the crossing share redemption requests first involves matching each unprocessed crossing share redemption request in the queue to an equivalent dollar amount of unmatched, pending purchase requests for crossing share classes and net purchase requests for non-crossing share classes. This matching continues for every next unprocessed crossing share redemption request in the queue until all crossing share redemption requests for which there is a sufficient cumulative dollar amount of purchase requests for crossing share classes and net purchase requests for non-crossing share classes have been matched. Any unprocessed crossing share redemption request that cannot be matched may remain unprocessed until the next processing period, unless investment fund 100 offers additional redemption options, which will be discussed herein later.

In an exemplary embodiment, the offsetting or matching of each crossing share redemption request against the daily cumulative dollar amount of purchase requests for crossing share classes and net purchase requests for non-crossing share classes is done on a first-come, first served basis. In this scheme, the unprocessed crossing share redemption request with the highest priority is offset (matched) first against purchase requests for crossing share classes and net purchase requests for non-crossing share classes. Then the unprocessed redemption request with the next highest priority is offset (matched) against further purchase requests for crossing share classes and net purchase requests for non-crossing share classes, and so on. In this way, crossing share redemption requests are processed in order of their respective priorities from highest to lowest. Method 200 continues to step 218.

In step 218, the crossing share redemption requests matched (offset) in step 216 are satisfied without purchasing or selling any underlying financial assets. Investment fund 100 retires the crossing shares held by the holder or holders of the matched crossing share redemption requests and provides cash to the redeeming party in an amount equal to the number of crossing shares redeemed multiplied by the NAV, without purchasing or selling any of the underlying financial assets. The offsetting purchaser is issued a requested share (conventional, exchange-traded, or crossing share) without investment fund 100 being required to purchase or sell any underlying financial assets.

The transfer of cash for shares is only effected for the crossing share redemption requests that have been matched to the daily cumulative amount of corresponding purchase requests for crossing share classes and net purchase requests for non-crossing share classes. Thus, for each crossing share redemption request received in step 212 and processed in step 216, by offsetting it against the daily cumulative amount of purchase requests for crossing share classes and net purchase requests for non-crossing share classes, the crossing share redeemer receives cash equal to the number of crossing shares redeemed multiplied by the NAV in exchange for relinquishing crossing shares. Crossing shares of unprocessed crossing share redemption requests are not redeemed, at least not pursuant to step 218. In some embodiments, particularly where there are no other classes of shares, there may be no additional redemption options available, and method 200 reverts back to step 212 in the next trading period.

In other embodiments, additional steps 220, 222, 224, and 226 may optionally be performed for share purchase requests and unprocessed crossing share redemption requests, depending upon the rules of investment fund 100. Steps 220, 222, 224, and 226 may be performed after step 218 or may be performed at any time. They are shown connected to step 218 with dashed lines to depict that they are each, individually, or all, collectively, optional.

As discussed above, following steps 216 and 218, there may be unprocessed crossing share redemption requests remaining. Where there are unprocessed crossing share redemption requests, steps 222, 224, and/or 226 may be options available to the investor, depending upon the rules of investment fund 100. It is contemplated that the prospectus of investment fund 100 may specify when steps 222, 224, and/or 226 are available, if at all.

In the embodiment in which investment fund 100 is an open-ended fund, additional crossing shares may be issued by expanding the pool of investments in step 220, if investment fund 100 provides step 220 as an option. Such issuance may be needed when, after steps 216 and 218 are performed, unmatched purchase requests for crossing shares remain. It is contemplated that the prospectus of investment fund 100 may specify when step 220 is available. Where step 220 is an available option and chosen by an investor, investment fund 100 issues additional crossing shares to the purchaser. Investment fund 100 purchases additional underlying financial assets for pool 110 with the cash from the purchaser to fund the share purchase request, and investment fund 100 then issues additional crossing shares to the purchaser. Thus, the value of the pool 110 of financial assets increases. Investment fund 100 may perform step 220 for each crossing share purchase request or up to some limit of shares available in the investment fund. The rules of investment fund 100 may limit the number of additional crossing shares issued because of capacity concerns for the investment fund.

Where step 222 is an available option and chosen by a redeeming party, investment fund 100 provides to the redeeming party an in-kind redemption in which a portion of the underlying financial assets of investment fund 100 is transferred to the redeeming party in lieu of cash. Correspondingly, the redeeming party relinquishes the crossing share or shares corresponding to the unprocessed redemption request to investment fund 100 and the redemption request is processed. The redeeming party comes to own the financial assets directly and is then responsible for any costs associated with later selling those underlying financial assets, rather than burdening investment fund 100 with those costs. Investment fund 100 may perform step 222 for as many unprocessed crossing share redemption requests as requested by the redeeming party and as its rules permit, thus taking them out of the queue. It is appreciated that the value of the in-kind redemption may equal the number of the redeemed crossing shares multiplied by the NAV. Any difference in value will be settled with a typically small cash distribution by investment fund 100 to the redeeming party. Although this option (step 222) may most frequently be exercised by an investor for unprocessed crossing share redemption requests remaining after steps 216 and 218, the rules of investment fund 100 may permit an in-kind redemption at any time or, optionally, only after a request remains unprocessed for a predetermined amount of time. Other embodiments of rules of investment fund 100 may choose not to permit this redemption option at all.

Where step 224 is an available option and chosen by a redeeming party, investment fund 100 provides a cash payment, less a redemption fee, to the redeeming party holding an unprocessed crossing share redemption request. Correspondingly, the redeeming party relinquishes the crossing share or shares corresponding to the unprocessed redemption request to investment fund 100 and the redemption request is processed. Investment fund 100 may perform step 224 for as many unprocessed crossing share redemption requests as requested by the redeeming party and as its rules permit. It is appreciated that the value of the cash payment may equal the number of the redeemed crossing shares multiplied by the NAV, less a redemption fee. Investment fund 100 may generate the cash by selling financial assets from pool 110, or it may rely on cash reserves. The redemption fee, which may be, for example, 1%, offsets costs incurred by investment fund 100 to sell a portion of the financial assets in pool 110 of investment fund 100, rather than passing along these costs to the other investors in the investment fund. Again, although this option (step 224) may most frequently be exercised by an investor for unprocessed crossing share redemption requests remaining after steps 216 and 218, the rules of investment fund 100 may permit a cash redemption with the redemption fee penalty at any time or, optionally, only after a request remains unprocessed for a predetermined amount of time. Other embodiments of rules of investment fund 100 may choose not to permit this redemption option at all.

In embodiments in which investment fund 100 comprises one or more classes of exchange-traded shares 130 that are listed for trading on a securities exchange and that are bought and sold at negotiated market prices, step 226 may be an available option for redemption of crossing shares (or conventional shares) also. For this option to be available, investment fund 100 issues a class of crossing shares, e.g., crossing shares 120, and a class of exchange-traded shares, e.g., exchange traded shares 130. A holder of crossing shares would then typically be permitted to acquire exchange-traded shares by requesting conversion of a designated number or dollar value of crossing shares for a monetarily equivalent number of exchange-traded shares, pursuant to step 226. Again, although this option (step 226) may most frequently be exercised by an investor for unprocessed crossing share redemption requests remaining after steps 216 and 218, the rules of investment fund 100 may permit conversion to an exchange-traded share class at any time or, optionally, only after a request remains unprocessed for a predetermined amount of time. Other embodiments of rules of investment fund 100 may choose not to permit this redemption option at all.

As described above, investment fund 100 may issue one or more classes of non-crossing shares, e.g., conventional shares 140, that are purchased and redeemed from investment fund 100 at NAV, in addition to at least one class of crossing shares 120. Purchase and redemption of conventional shares may proceed according to different methods. In one method, purchase and redemption of conventional shares are processed pursuant to the procedures of a conventional mutual fund. Thus, in addition to receiving purchase and redemption requests for crossing shares, investment fund 100 also receives purchase requests or redemption requests for conventional shares and tracks the redemption requests for both the crossing shares and the conventional shares. Redemption requests for each class of shares are tracked separately. Thus, the tracking and processing of the crossing share redemption requests proceeds as described above, and the tracking and processing of purchase and redemption requests for conventional shares may proceed in any manner generally known in the art and pursuant to procedures set forth in the prospectus for investment fund 100. Optionally, non-crossing shares may also be processed in a manner that minimizes changes in the underlying holdings of the investment fund, by matching redemptions and purchases of non-crossing shares such that the only changes to the underlying holdings of the investment fund are for net purchases or net redemptions after all other purchases and redemptions have been matched with one another, as discussed further below.

In another method, purchase of non-crossing shares, e.g., conventional shares 140, may be crossed with redemption of crossing shares, where the circumstances permit, even though they are not crossing shares. To the extent that the daily cumulative dollar amount of non-crossing share purchase requests exceeds the amount of the non-crossing share redemption requests, the excess cash flow may optionally be matched with unprocessed crossing share redemption requests and processed by paying the net cash tendered by purchasers of non-crossing shares to the crossing share redeemer without any change in the underlying holdings of the fund. In such case, however, the redeemed crossing shares would be retired and new non-crossing shares would be issued to the purchaser. Thus, step 218 of retiring redeemer's shares in exchange for cash may include the exchange of cash from the purchaser of any type of share. Where the term "share purchase request" is used herein rather than "crossing share purchase request," it refers to a purchase request for any type of share, unless explicitly limited to a particular type of share purchase request.

In yet another method, purchase of non-crossing shares, e.g., conventional shares 140, may be crossed with redemption of crossing shares and non-crossing shares, where the circumstances permit. To the extent that the daily cumulative dollar amount of share purchase requests exceeds the amount of the crossing share redemption requests, the excess cash flow may optionally be matched with non-crossing share redemption requests and processed by paying the net cash tendered by purchasers of shares to the non-crossing share redeemers without any change in the underlying holdings of investment fund 100. In such case, however, the redeemed non-crossing shares would be retired and new shares would be issued to the purchaser. Thus, step 218 of retiring redeemer's shares in exchange for cash may include the exchange of cash from the purchaser of any type of share. Purchase of non-crossing shares not matched to other shares is accomplished using known procedures in the art.

Continuing with the discussion of method 200, to the extent that there are any crossing share redemption requests that are not offset by purchase requests for crossing shares or non-crossing shares, when such offsetting is permitted by investment fund 100, the crossing share redemption requests remain unprocessed in step 218 and thus subject to processing via steps 222, 224, or 226, where those options are permitted. By contrast, in the embodiment of investment fund 100 that also includes non-crossing shares, to the extent that there are any unprocessed non-crossing share redemption requests, the non-crossing share redemption requests may be processed by selling underlying financial assets for investment fund 100, as appropriate, thereby causing investment fund 100 to incur transaction costs. To minimize transaction costs initiated by redemption of financial assets pursuant to non-crossing share redemption requests, holders of non-crossing shares may be restricted from re-purchasing shares in investment fund 100 for a set period of time after having redeemed non-crossing shares. Crossing shares investors do not have restrictions on repurchase of shares after redemption, but instead have redemption restrictions of the type noted herein.

Conventional shares in investment funds having both conventional shares and crossing shares are not limited only to having repurchase restrictions, however. Some investment funds may include conventional shares with different procedures to minimize transaction costs or deter market timing instead of or in addition to a repurchase restriction. In such investment funds, crossing share holders have redemption restrictions different from the conventional share restrictions in that the crossing share holders are restricted to cash redemption only if there is an offsetting cumulative dollar amount of net purchase requests for all share classes, or when rules allow, upon payment of a redemption fee.

In embodiments comprising exchange-traded shares 130, steps 210, 212, 214, 216 and 218 are carried out as described above for the non-exchange-traded shares. Investors holding either crossing shares 120 or conventional shares 140 (collectively, non-exchange-traded shares), where present, may also have the option of converting the non-exchange-traded shares 120 and 140 into exchange-traded shares 130 in step 226, typically at any time. In particular, crossing shares investors seeking to redeem crossing shares but not able to redeem the crossing shares pursuant to steps 216 and 218, may choose to use step 226 to convert the crossing shares into exchange-traded shares and then sell the exchange-traded shares on the appropriate exchange. This way, all transaction costs are borne by the investor rather than the investment fund, and the crossing shares investor needing liquidity but not able to wait for an offsetting cumulative amount of purchase requests has a readily-available redemption option that is less complex and potentially has fewer ultimate transaction costs than a redemption in kind pursuant to step 222.

All of the above embodiments provide an advantage over the prior art in that the investment fund manager does not have to sell financial assets and incur transaction costs and potentially realize capital gains when an owner of crossing shares redeems his or her shares. This provides a vehicle for large, short-term investors who would like to hold mutual funds, need liquidity, and would otherwise be prevented from participating in investment funds having restrictions against short-term investing. Such restrictions are being increasingly enacted to minimize the effects of market timing and to minimize transaction costs generally. Thus, the present invention minimizes transaction costs, yet still provides a relatively liquid investment vehicle for large, short-term investors.

It should be understood that an embodiment of the present invention may be implemented by a computer or a network of computers, i.e., one or more computer systems, and that additional aspects of the invention include computer hardware and/or software-programmed hardware systems or networks of such computer hardware and/or such software-programmed hardware systems for carrying out the disclosed method steps. For example, an embodiment of the invention includes a computer program storage device readable by a machine, tangibly embodying a program of instructions executable by the machine to perform any or all of the method steps as described and claimed herein. Additionally, computer hardware and software may be configured and programmed in accordance with procedures known in the art to carry out the various methods discussed herein. In particular, a computer or a network of computers may be programmed for issuing shares, tracking redemption requests, processing the purchase and redemption requests and recording purchaser shares.

Specifically, it is to be understood that some or all of the steps of method 200 may be carried out by, or with the assistance of, a computer or network of computers, including but not limited to automated processes for the following: (i) issuing shares, including at least one class of crossing shares (Step 210); (ii) receiving share purchase requests (Step 212); (iii) receiving and tracking crossing share redemption requests (Step 212); (iv) processing share purchase requests (Step 214); (vi) matching unprocessed crossing share redemption requests against daily cumulative dollar amounts of all purchase requests for crossing share classes and net purchase requests for non-crossing share classes (Step 216); and (vii) retiring shares of redeemers in exchange for cash (Step 218). Further, optional steps of method 200 may be carried out by, or with the assistance of, a computer or network of computers, including but not limited to automated processes for the following: (a) issuing additional crossing shares (Step 220); (b) redeeming shares in kind (Step 222);

cashing out shares (with a redemption fee) (Step 224); (c) converting non-exchange traded shares into exchange traded shares (Step 226); and (d) the variations and modifications of the steps of the methods described herein. It should also be understood that the programming techniques necessary to automate such steps by computer are well known in the art.

Computer hardware and software may be used to create and access databases for tracking the owner of each share in the investment fund as well as the repayment of cash relating to processed redemption requests. The steps of purchasing shares from a purchase request and retiring shares from a redemption request may comprise the computer updating a computer database to debit and credit purchasers' and redeemers' accounts to reflect ownership of the shares. Similarly, in embodiments comprising different share classes, such as conventional, exchange-traded, and crossing shares, computers may be programmed to track the conversion of one type of share to another.

Computers may also be used to create, buy, and sell baskets of individual financial assets to be added to or subtracted from the investment fund, as needed, or for otherwise maintaining the record of financial assets held by the investment fund. Instructions relating to specific actions to be taken by the computer programs in administering the investment fund and maintaining investor records may be entered by any means, including entry directly by an investor using telephone or computer access over the Internet, or entry by a representative of the fund administrator pursuant to instructions received from an investor via mail, via telephone, or in person. Computers are also typically used to calculate the NAV of a share in the investment fund.

Investment fund 100 is depicted and described herein as a single investment fund with a number of different share class options and redemption options available, but any combination of share classes and redemption options may be provided, depending on what is desired to suit a particular purpose for the investment fund. For example, wherein one embodiment may comprise an investment fund having one or more crossing share classes 120, one or more exchange-traded share classes 130, and one or more conventional share classes 140 available, and may offer redemption steps 222, 224, and 226 as well as purchase step 220 for the crossing shares class, other embodiments may, for example, comprise all of the above share classes but only redemption steps 222 and 224 available, or some other combination of redemption steps fewer than shown in FIG. 2 and described above. Furthermore, exemplary investment funds may comprise additional classes of shares not specifically described above and/or additional redemption options not specifically described above, in any combination with any or all of the share classes and/or redemption options described. Still further, in another embodiment, an exemplary fund may comprise a single class of shares, in which crossing and/or non-crossing functionality is governed not by the issuance of discrete share classes, but rather by contractual agreement by the purchaser of designated crossing shares, who voluntarily accepts one or more of the restrictions discussed herein with respect to crossing shares. The crossing shares may include all of the shares in the fund, or a portion of the shares in the fund, with remaining shares being non-crossing shares.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for administering an investment fund comprising an aggregation of a plurality of underlying financial assets, the method comprising the steps of:
    (a) issuing at least one class of shares for purchase and redemption from the fund at a net asset value, including at least one class of crossing shares having crossing share redemption restrictions;
    (b) issuing at least one class of non-crossing shares that do not have the crossing share redemption restrictions;
    (c) tracking, by a computer programmed to perform such tracking, crossing share redemption requests; and
    (d) processing for cash redemption, by a computer programmed to perform such processing, only as many crossing share redemption requests from one or more redeeming parties as are offset by processing a cumulative dollar amount of share purchase requests from one or more purchasing parties, the share purchase requests processed by:
        (i) retiring redeemed crossing shares corresponding to the crossing share redemption requests in exchange for providing to the one or more redeeming parties cash equal to the number of redeemed crossing shares multiplied by a net asset value of the redeemed crossing shares, and
        (ii) issuing shares corresponding to the share purchase requests to the one or more purchasing parties to offset the retired redeemed crossing shares.

2. The method of claim 1, wherein the at least one class of non-crossing shares comprises one or more classes of exchange-traded shares that are listed for trading on a securities exchange and that are bought and sold at negotiated market prices wherein the crossing share restrictions permit a holder of crossing shares to acquire exchange-traded shares, further comprising a step of:
    (e) processing, by a computer programmed to perform such processing, one or more crossing share redemption requests by converting the designated number or dollar value of crossing shares for the monetarily equivalent number of exchange-traded shares.

3. The method of claim 1, wherein step (d) is effected without assessing a redemption fee for the cash redemption.

4. The method of claim 1 wherein the crossing share restrictions permit a holder of crossing shares to redeem crossing shares for cash less a redemption fee, the method further comprising a step of:
    (e) processing, by a computer programmed to perform such processing, one or more crossing share redemption requests for cash less the redemption fee.

5. The method of claim 4, wherein an investor is permitted to exercise step (e) only for crossing share redemption requests remaining unprocessed after step (d) has been performed.

6. The method of claim 1, wherein the crossing share restrictions permit a holder of crossing shares to redeem crossing shares in kind for a basket of underlying financial assets plus a representative portion of residual cash, the method further comprising a step of:
    (e) processing, by a computer programmed to perform such processing, one or more crossing share redemption requests by redeeming the one or more crossing shares in kind for the basket of the underlying financial assets plus the representative portion of residual cash.

7. The method of claim 1, wherein the at least one class of non-crossing shares comprises one or more classes of conventional shares having one or more conventional share restrictions different from the crossing share redemption restrictions, further comprising a step of:
(e) processing, by a computer programmed to perform such processing, redemption of conventional shares for cash without requiring an equivalent number of share purchase requests.

8. The method of claim 1, wherein the share purchase requests comprise exchange-traded share purchase requests and crossing share purchase requests, and the shares issued to the one or more purchasing parties comprise exchange-traded shares and crossing shares pursuant to the share purchase requests.

9. The method of claim 1, wherein share purchase requests comprise conventional share purchase requests and crossing share purchase requests and the shares issued to the one or more purchasing parties comprise conventional shares and crossing shares pursuant to the share purchase requests.

10. The method of claim 1, wherein the share purchase requests are limited to crossing share purchase requests and the shares issued to the one or more purchasing parties are limited to crossing shares.

11. The method of claim 1, further comprising a step of:
(e) processing, by a computer programmed to perform such processing, crossing share purchase requests not used to offset the processed crossing share redemption requests by purchasing additional underlying financial assets for the investment fund and then issuing additional crossing shares to the purchasing party.

12. The method of claim 1, wherein the crossing share redemption requests processed in step (d) are processed on a first-come, first-served basis.

13. The method of claim 1, wherein the offsetting cumulative dollar amount of share purchase requests comprises a daily cumulative dollar amount of crossing share purchase requests.

14. The method of claim 1, wherein the crossing share redemption restrictions includes a restriction permitting redemption of a crossing share only under one or more conditions selected from the group consisting of: (A) if a share purchase request is available to offset such redemption; (B) if a redemption fee is paid; (C) if the crossing share is converted to an exchange-traded share; and (D) if the crossing share is exchanged in kind for a basket of underlying financial assets plus a representative portion of residual cash.

15. The method of claim 14, wherein step (d) is processed without assessing the redemption fee and wherein the method further comprising one or more of the following steps:
(e) processing, by a computer programmed to perform such processing, one or more crossing share redemption requests by converting the designated number or dollar value of crossing shares for the monetarily equivalent number of exchange-traded shares;
(f) processing, by a computer programmed to perform such processing, one or more crossing share redemption requests by redeeming the one or more crossing shares in kind for the basket of the underlying financial assets plus the representative portion of residual cash;
(g) processing, by a computer programmed to perform such processing, one or more crossing share redemption requests for cash less the redemption fee.

16. The method of claim 1, wherein the offsetting cumulative dollar amount of share purchase requests comprises a daily cumulative dollar amount of crossing share purchase requests and net purchase requests for non-crossing shares.

17. A method for minimizing transaction costs in an investment fund comprising an aggregation of a plurality of underlying financial assets, the method comprising the steps of:
(a) issuing at least one class of exchange-traded shares that are listed for trading on a securities exchange and that are bought and sold at negotiated market prices;
(b) issuing two or more classes of non-exchange-traded shares, including:
(i) at least one class of crossing shares that are purchased and redeemed from the fund at a net asset value and that have one or more crossing share redemption restrictions; and
(ii) at least one class of conventional shares that are purchased and redeemed from the fund at a net asset value and that have one or more conventional share restrictions different from the crossing share redemption restrictions;
(c) processing, in a computer system, redemptions of crossing shares requested by holders of the crossing shares without the conventional share restrictions and without a redemption fee only:
(i) for cash if there is an offsetting value of cash requests to purchase shares in the fund, wherein effecting the redemption of the crossing shares comprises transferring net cash tendered by purchasers of shares to the holders of the crossing shares without purchase or sale of any underlying financial assets,
(ii) for exchange-traded shares by conversion of the crossing shares of the holders for a monetarily equivalent value of exchange-traded shares; or
(iii) for a basket of the underlying financial assets represented by the crossing shares of the holders.

18. The method of claim 17, further comprising not permitting the holders of the crossing shares to redeem the crossing shares for cash at all, except pursuant to step (c)(i).

19. The method of claim 17, further comprising permitting the holders of the crossing shares to redeem the crossing shares for cash not pursuant to step (c)(i) only with payment of a redemption fee.

20. A method for administering an investment fund comprising an aggregation of a plurality of underlying financial assets, the method comprising the computer implemented steps of:
(a) issuing a plurality of shares that are each purchased and redeemed from the fund at a net asset value, including one or more crossing shares having crossing share redemption restrictions;
(b) tracking crossing share redemption requests in a computer system;
(c) processing for cash redemption only as many crossing share redemption requests from one or more redeeming parties as there are an offsetting cumulative dollar amount of share purchase requests by purchasing crossing shares redeemed by the one or more redeeming parties, the redeemed crossing shares corresponding to the processed crossing share redemption requests, the purchasing comprising retiring the redeemed crossing shares in exchange for cash equal to the number of redeemed crossing shares multiplied by a net asset value of the redeemed crossing shares.

21. The method of claim 20, wherein the plurality of shares further include one or more conventional shares having conventional share redemption restrictions different from the crossing share redemption restrictions, further comprising a step of:
(d) processing for cash redemption conventional share redemption requests without requiring an equivalent number of share purchase requests.

22. The method of claim 20, wherein the share purchase requests include crossing share purchase requests, further comprising a step of:

(d) processing crossing share purchase requests not used to offset the crossing share redemption requests by purchasing additional underlying financial assets for the investment fund and then issuing additional crossing shares to the purchasing party.

23. The method of claim 20, wherein step (c) comprises processing for cash redemption only as many crossing share redemption requests as there are an offsetting daily cumulative dollar amount of crossing share purchase requests.

24. The method of claim 20, wherein step (c) comprises processing for cash redemption only as many crossing share redemption requests as there are an offsetting daily cumulative dollar amount of crossing share purchase requests and net purchase requests for non-crossing shares.

* * * * *